United States Patent
Page (10) Patent No.: US 7,281,659 B2
(45) Date of Patent: Oct. 16, 2007

(54) SELF-OPTIMIZING SYMBOLOGY READER

(75) Inventor: Harry Page, Almonte (CA)

(73) Assignee: Psion Teklogix Systems Inc., Mississauga, Ontario (CA)

( * ) Notice: Subject to any disclaimer, the term of this patent is extended or adjusted under 35 U.S.C. 154(b) by 188 days.

(21) Appl. No.: 10/980,012

(22) Filed: Nov. 3, 2004

(65) Prior Publication Data

US 2006/0091216 A1 May 4, 2006

(51) Int. Cl.
*G06K 7/10* (2006.01)

(52) U.S. Cl. ............ 235/462.07; 235/462.01; 235/462.25; 235/454

(58) Field of Classification Search ............... 235/462.01–462.49, 454
See application file for complete search history.

(56) References Cited

U.S. PATENT DOCUMENTS

| | | | |
|---|---|---|---|
| 5,481,098 A * | 1/1996 | Davis et al. ............ 235/462.07 |
| 5,739,518 A | 4/1998 | Wang | |
| 5,825,006 A | 10/1998 | Longacre, Jr. et al. | |
| 5,900,613 A | 5/1999 | Koziol et al. | |
| 5,929,418 A | 7/1999 | Ehrhart et al. | |
| 5,932,862 A | 8/1999 | Hussey et al. | |
| 5,965,863 A * | 10/1999 | Parker et al. ............ 235/462.25 |
| 5,992,744 A | 11/1999 | Smith et al. | |
| 6,400,996 B1 | 6/2002 | Hoffberg et al. | |
| 6,491,223 B1 | 12/2002 | Longacre, Jr. et al. | |
| 6,637,658 B2 * | 10/2003 | Barber et al. ............ 235/462.45 |
| 6,889,903 B1 * | 5/2005 | Koenck ................. 235/462.01 |
| 2002/0171745 A1 * | 11/2002 | Ehrhart ................... 348/231.3 |
| 2003/0146283 A1 | 8/2003 | Longacre, Jr. et al. | |
| 2004/0041029 A1 * | 3/2004 | Postman et al. ......... 235/462.3 |

* cited by examiner

*Primary Examiner*—Daniel Hess
(74) *Attorney, Agent, or Firm*—Pearne & Gordon LLP (57) ABSTRACT

The present invention provides a method to optimize the configuration of a symbology reader without the need for user intervention. Following a predetermined number of successful decodes, the reader automatically determines the symbology of interest and disables the decoding algorithms not being used. For example, if after four or five successful decodes have occurred and the unit determines that all of the successful decodes were of a single symbology type such as a PDF417 barcode, all other decoding algorithms, with the exception of the PDF417 decoder, will be disabled. Other embodiments may be included which adjust the scan window size and the image capture parameters of the reader based on the symbology of interest.

33 Claims, 9 Drawing Sheets

SELF-OPTIMIZING SYMBOLOGY READER

FIELD OF INVENTION

The present invention relates generally to symbology readers, and more particularly to a method for automatically optimizing the configuration of a symbology reader.

BACKGROUND OF THE INVENTION

Barcode readers, including scanners, symbology readers and image readers, are typically supplied with a wide range of decoding algorithms active within the operating software. Present-day barcode or optical character decoders are usually software algorithms which analyze the signal or image obtained by the barcode reader and decipher the information encoded in the barcode symbology. The decoded data is then stored for later processing or forwarded to a microprocessor. As the manufacturer of these barcode readers often cannot tell in advance how the device is to be used, the full range of common symbologies, generally one dimensional and two dimensional barcodes, as well as postal codes and optical character fonts are typically supported and their decoding algorithms are enabled for decoding at all times.

Further, in image-based readers, a large field of view is often the default state, as again, the manufacturer cannot determine in advance the intended application. The symbologies can range from large, multi-code labels where the full field of view is both desired and necessary, to small barcodes that occupy significantly less of the total area capture in each scan.

There are a number of prior art techniques in which a category of decode algorithms may be selected from a menu. The driver for selecting a group or even a single decoding algorithm in a device to reduce the time required to successfully determine the existence of a symbology, deciphers the coded information and passes this information to some external information management system, thereby maximizing operating productivity. Generally, the selection of categories would include either one-dimensional or two-dimensional barcodes, postal codes or optical characters. One-dimensional barcodes are barcodes in which the data is encoded along a single axis. One-dimensional barcodes are commonly used in grocery stores and other retail applications. UPC/EAN code, Code 39 and Code 49 are all examples of one-dimensional barcodes. Two-dimensional barcodes are barcodes in which data is encoded in both the horizontal and vertical dimensions. PDF417 and maxicode are examples of two-dimensional barcodes. Postal codes ressemble one-dimensional barcodes. POSTNET, PLANET and Royal Mail 4 state are examples of post codes. Optical characters are typically OCR A and OCR B font—typically used for machine read applications.

In these menu driven barcode readers, an operator would select between one or more of the available barcode options depending on the symbology type of interest. For example, if the one-dimensional option is selected, the two dimensional decoding algorithms are typically disabled. The main drawback to this type of system is that it requires operator intervention in order to select the decode parameters. For this operator intervention to be effective the user must be capable of differentiating between the myriad of codes, often something the operator is not able to do.

U.S. Pat. No. 5,825,006 which issued to Longacre, Jr. et. al. on Oct. 20, 1998 and is assigned to Welch Allyn, Inc., details a menu driven barcode reader having improved auto discrimination features. The system refers to a parameter table in memory during the decode operation to auto discriminate between 1D and 2D barcode types. If a 1D barcode is being scanned, all 2D barcode decoding algorithms are disabled. While this system does partially optimize the operation of the bar code reader by disabling all algorithms relating to a broad category of decode algorithms not being used, it does have the drawback of not disabling all unused decode routines. Further, this system does not include a feature with image-based readers, whereby the field of view (FOV) or other optical operating parameters can be adjusted to accommodate the area or dimensions of the symbology of interest. These menu-driven barcode readers can be configured either through the use of a host-based menu, or the use of what is known in the industry as configuration barcodes. These barcodes contain the instructions to set the device into a specific operating mode. If the end user desires to alternate between a series of modes, configuration barcodes must be created and be available at the point of use to allow the user to change the operating parameters of the device by successfully decoding the instruction set in the barcode.

Other products available to barcode users, including portable data terminal devices such as the Symbol Technologies PDT8100™ or the Hand Held Product Dolphin 9500™, utilize a screen-driven menu in which a user can select a symbology or symbologies of interest, however, this requires the user to be able to anticipate which symbols will be encountered and manually initialize or change the enabled decoders. These units are often supplied with a default or subset of the total available decoders enabled. This default set is selected in an attempt to optimize the operating speed of the device by disabling similar but different decoding algorithms that when enabled, often result in latency in the decoding operation or the perception of "sluggishness" by the user. If the attempted code to be read is not enabled, and the user is not particularly skilled in determining the actual code or in the use of the appliance, the unit will not successfully decode the symbol regardless of the number of attempts. The user will then, most often incorrectly, determine something is wrong with the appliance and seek further technical support or even attempt to return the device for repair. This results in considerable operating inefficiency and increases the total cost of ownership of the appliance due to the loss of productivity and incremental overhead in providing support for what is a configuration problem.

These units also allow for the operator to select an operating window or field of view and image capture configuration of the appliance to reflect the use application. This again requires the operator to be able to determine the field of view or window size that is optimum and the best image capture configuration to ensure image fidelity. The selection of these parameters has a significant effect on both the time required to capture and process an image, as well as image fidelity.

Therefore there is a need for a self-optimizing symbology reader which does not require operator intervention in order to configure the decode parameters for maximum productivity.

SUMMARY OF THE INVENTION

The present invention is directed to a method for optimizing a symbology reader having activated decode algorithms. The method comprises scanning a succession of symbols, decoding the scanned symbols, tracking successfully decoded symbols, identifying a symbol type from among the succession of successfully decoded symbols, and disabling all decode algorithms not used to decode the identified symbol type.

In accordance with a further aspect of this invention the method comprises scanning a succession of symbols, decoding the scanned symbols, storing symbol type information, counting the number of successively decoded symbols, identifying a symbol type from among the number of successively decoded symbols, and disabling all decode algorithms not used to decode the identified symbol type.

In accordance with a specific aspect of this invention, the method may comprise identifying the size of the identified symbol type and adjusting the symbology reader window size and/or identifying image capture parameters and adjusting the symbology reader image capture parameters.

In accordance with another aspect of the invention, the method comprises retrieving a pixel per element count from the scanned symbol, reducing the symbology reader integration time and gain when the count is below a predetermined threshold level, and increasing the symbology reader integration time and gain when the count is above a predetermined threshold level.

Further, the present invention is directed to system for optimizing a symbology reader having activated decode algorithms. The system comprises a scanner for scanning a succession of symbols, a decoder for decoding the scanned symbols, a tracker for tracking successfully decoded symbols, an element for identifying a symbol type from among the succession of successfully decoded symbols, and a control for disabling all decode algorithms not used to decode the identified symbol type.

In accordance with a further aspect of this invention the system comprises a scanner for scanning a succession of symbols, a decoder for decoding the scanned symbols, a memory for storing symbol type information, a counter for counting the number of successively decoded symbols, an element for identifying a symbol type from among the number of successively decoded symbols, and a control for disabling all decode algorithms not used to decode the identified symbol type.

In accordance with a specific aspect of this invention, the system may comprise a unit for identifying the size of the identified symbol type, and a control for adjusting the symbology reader window size, and/or a unit for identifying image capture parameters, and a control for adjusting the symbology reader image capture parameters.

In accordance with another aspect of this invention, the system comprises a counter for retrieving a pixel per element count from the scanned symbol, a control for reducing the symbology reader integration time and gain when the count is below a predetermined threshold level, and a control for increasing the symbology reader integration time and gain when the count is above a predetermined threshold level.

In accordance with a further aspect of the invention, the system includes a control for resetting the symbology reader defaults.

In accordance with another specific aspect of the invention, the symbol type is a specific symbol.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION

For purposes of explanation, specific embodiments are set forth to provide a thorough understanding of the present invention. However, it will be understood by one skilled in the art, that the invention may be practiced without these specific details. Moreover, well-known elements, devices, process steps and the like are not set forth in detail in order to avoid obscuring the scope of the invention described.

In symbology readers, including scanner and image based readers, the invention provides methods for optimizing configuration parameters with limited need for operator intervention.

Figure 1:
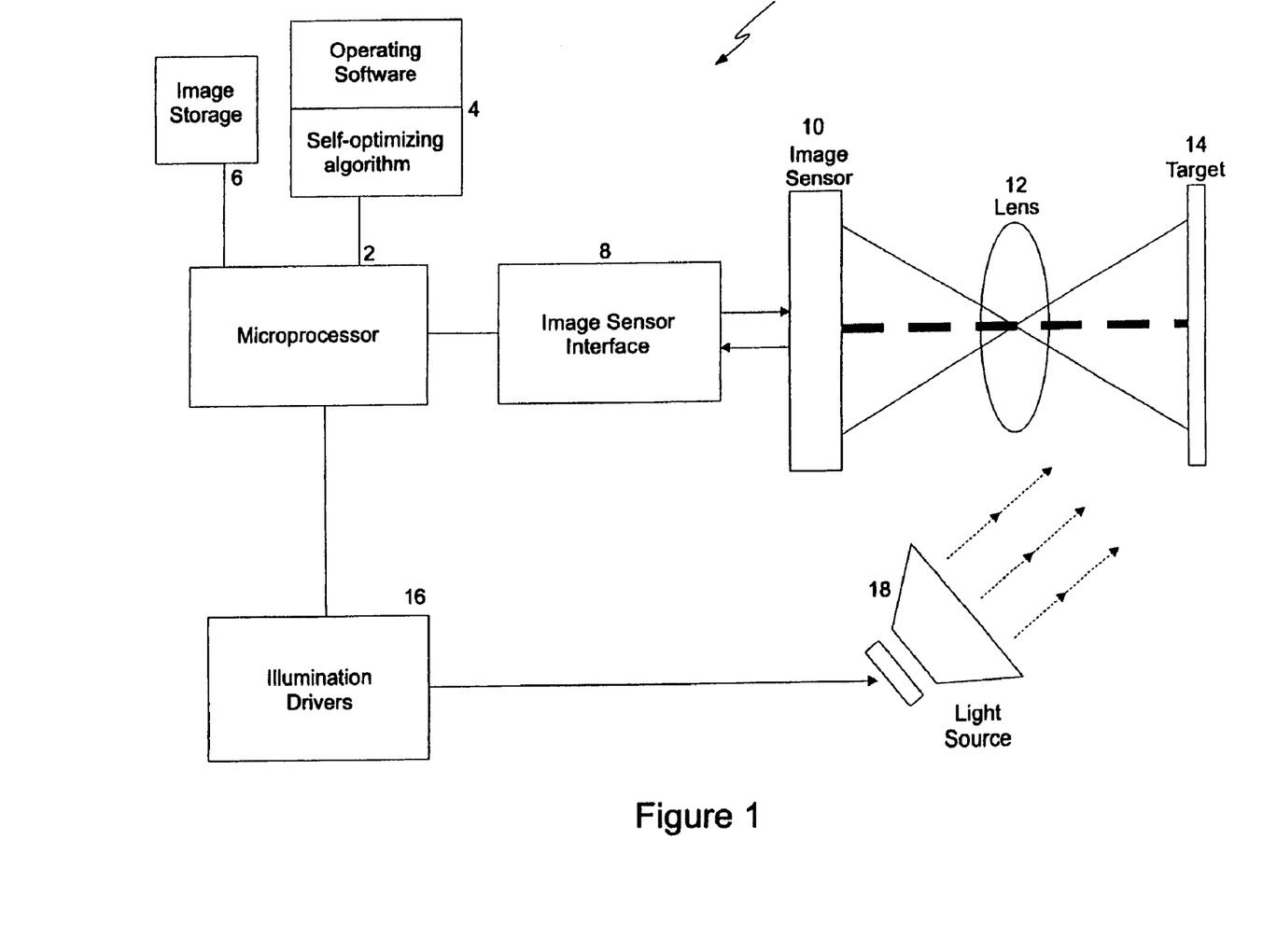
FIG. 1 is a schematic representation of a symbology reader in accordance with an embodiment of the present invention.

The method of self-optimization, in accordance with the present invention, may be implemented by the system shown in FIG. 1. An image based symbology reader 1 in accordance with the present invention comprises a microprocessor 2 that controls all aspects of the image capture, analysis, decoding and external host interface, and utilizes operating software stored in nonvolatile memory 4 and a self-optimizing algorithm also stored in memory 4. Reader 1 further includes an image storage 6 and an image sensor interface 8. The image sensor 10 may be either CMOS or CCD. An objective lens 12 is positioned in front of the image sensor 10 to direct the image of the target 14 onto the image sensor 10. Memory 5 receives the image from the image sensor 10 and stores it for the image process and analysis routine. This image is also available for transport to an external source as a picture of the scene or object of interest. An illumination system for lighting the target 14 comprises illumination drivers 16 and an illumination source 18, which usually includes light emitting diodes (LED's).

Figure 2:
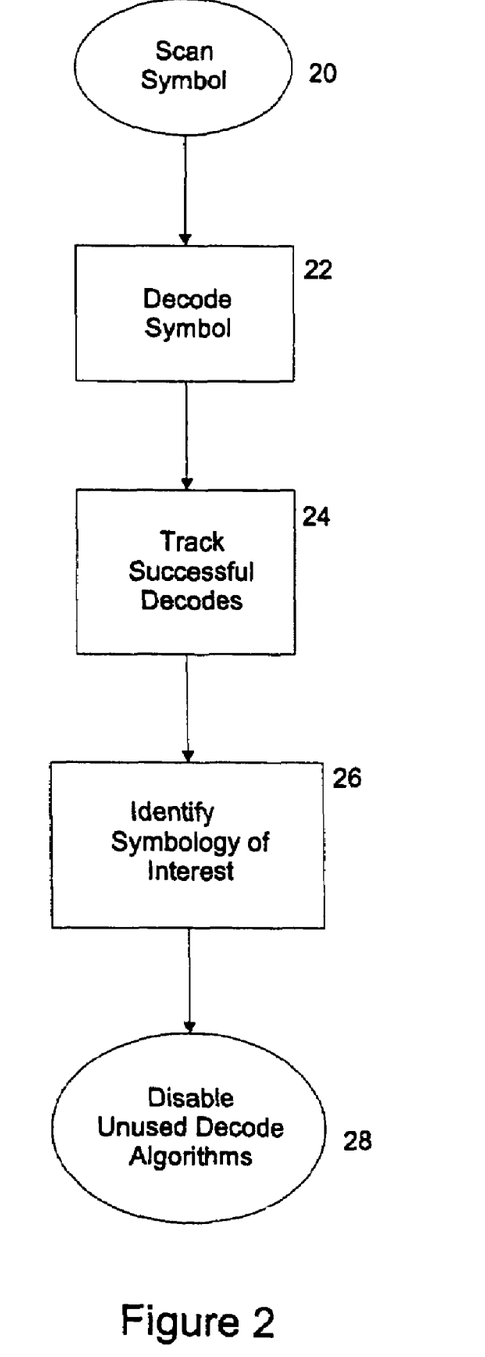
FIG. 2 is a flow chart illustrating the basic steps of the method in accordance with an embodiment of the present invention

A basic self-optimizing mode of operation of reader 1 is illustrated in FIG. 2. A symbology is scanned (or imaged) 20 and decoded 22. Each time the symbology reader performs a decode sequence, information about that decode sequence is tracked and written to memory 24. A series of successful and successive decode cycles are detected representing a sequence of identical symbology types, and a symbology of interest is identified 26. Next, all unused decode algorithms are disabled 28, leaving only the decode algorithm relating to the symbology of interest.

Initially, the default settings reset after a predetermined number of unsuccessful or unsuccessive decodes takes place. For example the symbology reader may automatically reset the default settings after four or five failed decodes. They may also be reset by a trigger routine activated by the human operator. A trigger routine for example, may require that a human operator activate the trigger mechanism used for initiating a decoding sequence three times in a row, or alternatively, holding down the trigger mechanism for a number of seconds. In another embodiment, after a predetermined number of unsuccessful or unsuccessive decodes takes place, the user may scan what is typically known as a configuration barcode to reset the operating system parameters to a default condition.

Once the unused decode algorithms have been disabled, any subsequent symbology which is different from the symbology of interest will result in a failed decode attempt. After a predefined number of failed attempts to decode this symbology, the reader will default to the full range of decoders. For example, if the symbology of interest is PDF417 and the next symbol to be scanned is a Code 39 symbol, then the decode attempt will fail. At this point a human operator could trigger a reset, or the reader 1 would reset the decoders once a predefined number of failed decodes had taken place.

These steps are described in further detail with reference to the flowchart of FIG. 3. The symbology reader 1 of the present invention is programmed with a selectable, self-optimizing mode 30. The mode may be selected by a trigger mechanism of some kind, or as a menu option on the device interface. Once the self-optimizing mode 30 is selected, the symbology reader 1 is capable of auto-discriminating between various types of standard symbologies, usually one-dimensional or two-dimensional barcodes, but also encompassing postal or optical character symbols.

When a symbology is scanned 32 and decoded 34, information that is captured in memory 40 includes the symbology type, e.g. Code 39 or PDF 417, and in the case of image based symbology readers 1, may also include the physical size of the symbology as determined by the portion of the image sensor array occupied by the symbol, and the number of pixels per feature occupied by the barcode elements. Once the self-optimizing mode has been selected, the self-optimizing algorithm tracks the number of decoding attempts 36 made by the symbology reader 1. A query 38 determines if the decode is successful. If it is, the data is output 42 and the information is passed on to the next query 44. At query 36 the number of decode attempts are tracked and if a predefined number of decodes are unsuccessful, the symbology reader resets the defaults 52 if necessary.

At query 44 the successful decodes are tracked and if the predefined number of successful decodes are not reached, the algorithm retrieves the next symbol to be scanned 46. If the predefined number of successful decodes are reached, then the next query in the algorithm determines whether these decodes are successive 48, i.e. whether the decoded symbologies are sequentially the same type of symbology? If they are not, the next symbol is scanned 46, however, if they are successive, the algorithm disables all unused decode algorithms 50. For example, if after five successful decodes it was determined that all decodes utilized the PDF417 decode routine, all other decoding algorithms, with the exception of the PDF417 algorithms, would be disabled. The reader 1 then continues to scan and decode subsequent PDF417 symbologies.

Once the unused decoders are disabled, and a new symbol of a type other than the selected symbology of interest is to be decoded, then the unused decoders may be reset in one of two ways. Either the human operator could activate the trigger routine to reset the defaults, or the self-optimizing algorithm would automatically reset the disabled decoders, since the new symbology type would generate failed decode attempts.

In an alternative embodiment of the present invention, a grouping of related symbologies may also be selected in the same manner as above. For example, if the symbology of interest were identified as a Code 39 barcode, which is used in industrial applications, the self-optimizing algorithm would disable all other groupings of symbologies with the exception of the decoder grouping pertaining to similar industrial symbologies. The industrial symbology decoder group may include Interleaved 2 of 5, Codabar and Code 128 as well as Code 39 symbologies. By identifying just one of these codes as the symbology of interest, the entire group of symbologies remains enabled in the reader. This may be useful in situations where a number of similar and related symbologies will be used repeatedly. These groupings of decode algorithms could relate to a variety of applications including retail, postal and industrial symbologies or it could include combinations of these and other applications. These groups may be user-definable within the host interface as a user option symbol grouping mode. The user can select any combination of available codes to reflect the operation at hand.

Figure 3:
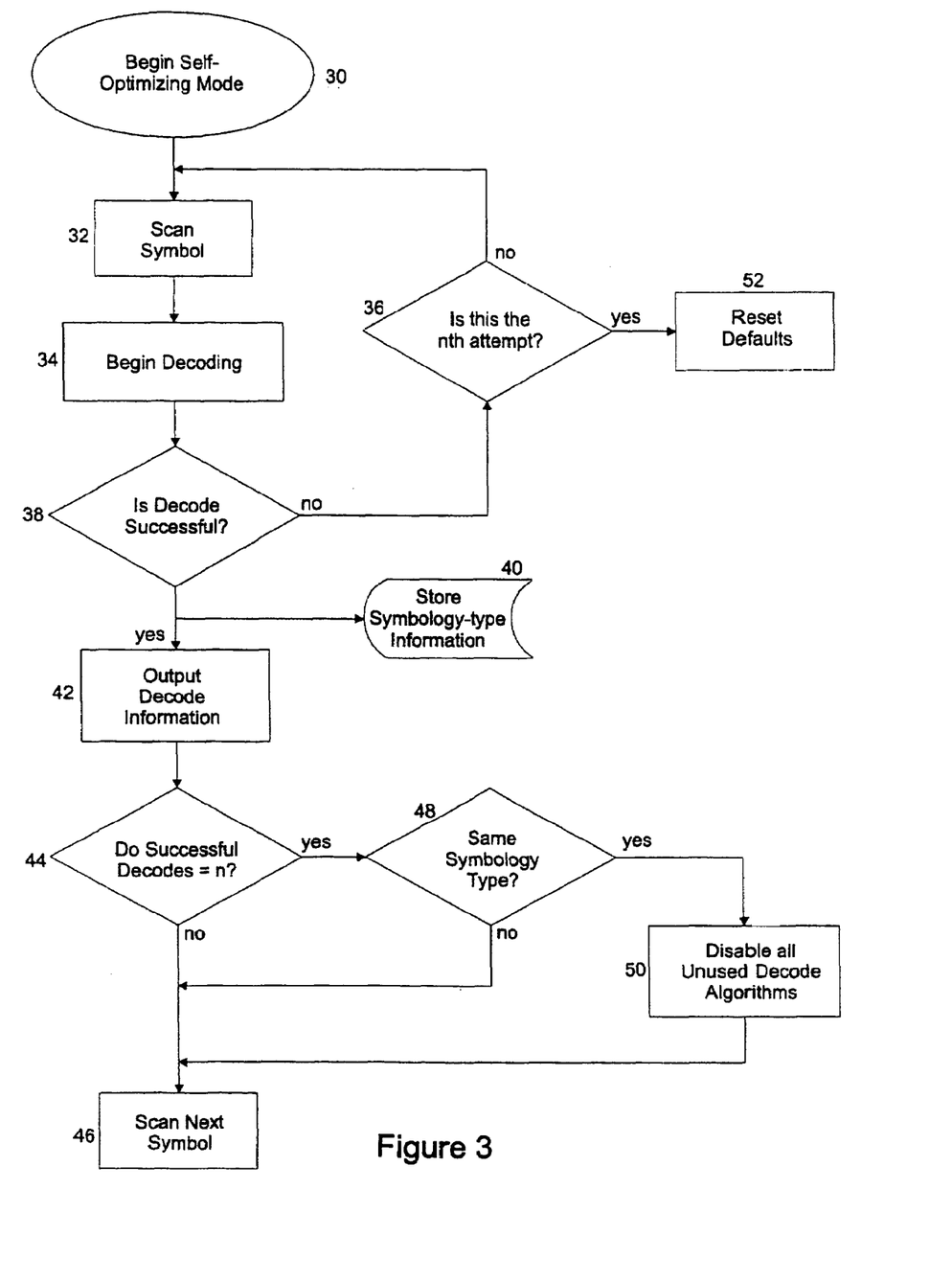
FIG. 3 is a partial flow chart illustrating the method of the embodiment described in FIG. 2.
Figure 4:
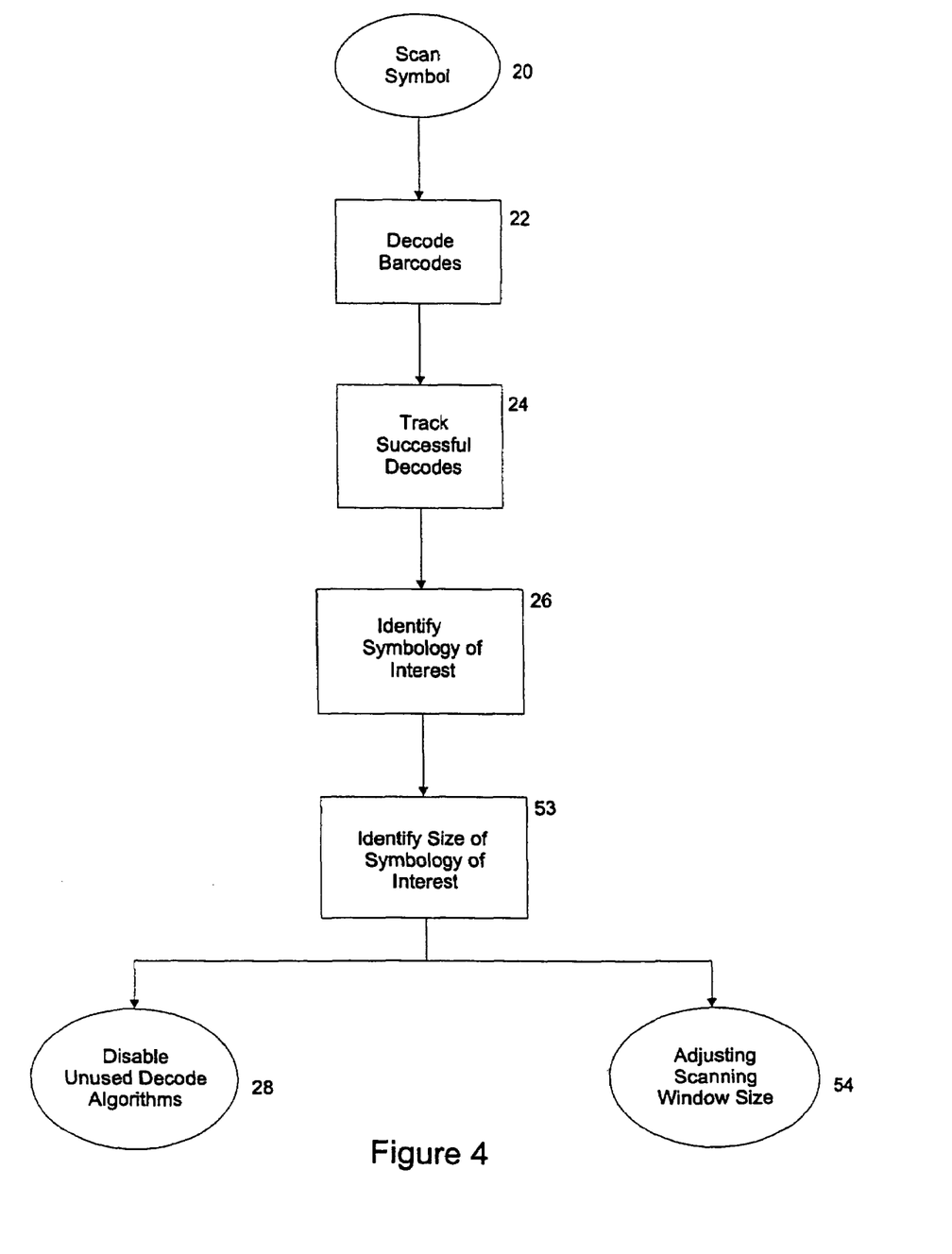
FIG. 4 is a flow chart illustrating the basic steps of the method in accordance with another embodiment of the present invention.
Figure 5:
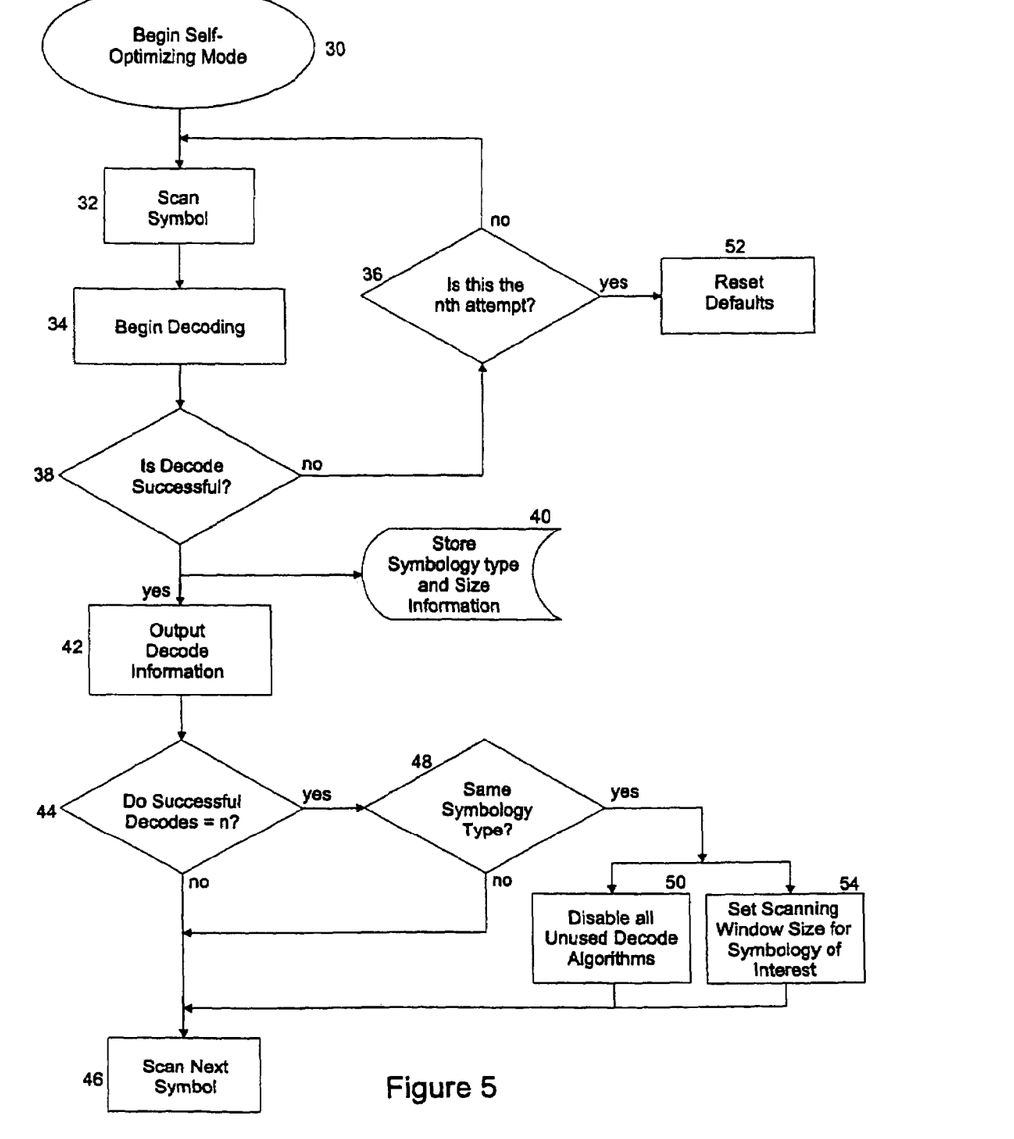
FIG. 5 is a partial flow chart describing the method of the embodiment described in FIG. 4.

Another embodiment of the present invention, is illustrated in FIGS. 4 and 5 and relates generally to image-based symbology readers. While most of the steps in the self-optimizing mode remain unchanged from the embodiment above illustrated in FIG. 3, a step may be added whereby the field of view (FOV) of an image-based symbology reader can be changed by adjusting the scanning window size 54 to accommodate the symbology of interest. When the self-optimizing mode is activated, a symbology is scanned (imaged) 20 and decoded 22. Each time the symbology reader performs a decode sequence, information about that decode sequence is tracked and written to memory 24. Additionally, in this embodiment, information pertaining to the size and aspect ratio of the symbology 53 is also tracked. Once the symbology of interest has been identified 26, all unused decode algorithms are disabled 28, leaving only the decode algorithm relating to the symbology of interest and the scanning window size is adjusted 54 thereby changing the FOV to accommodate the symbology of interest.

The scanning window represents the pixels in the image sensor array which are actually read during each cycle. Narrowing the FOV significantly reduces the time required to complete a decode cycle. By capturing the actual size and aspect ratio of a series of successively decoded symbologies, as well as the symbology type, in memory 40, the symbology reader of the present invention can self-adjust its scanning window 54 to accommodate the symbology of interest.

Figure 6:
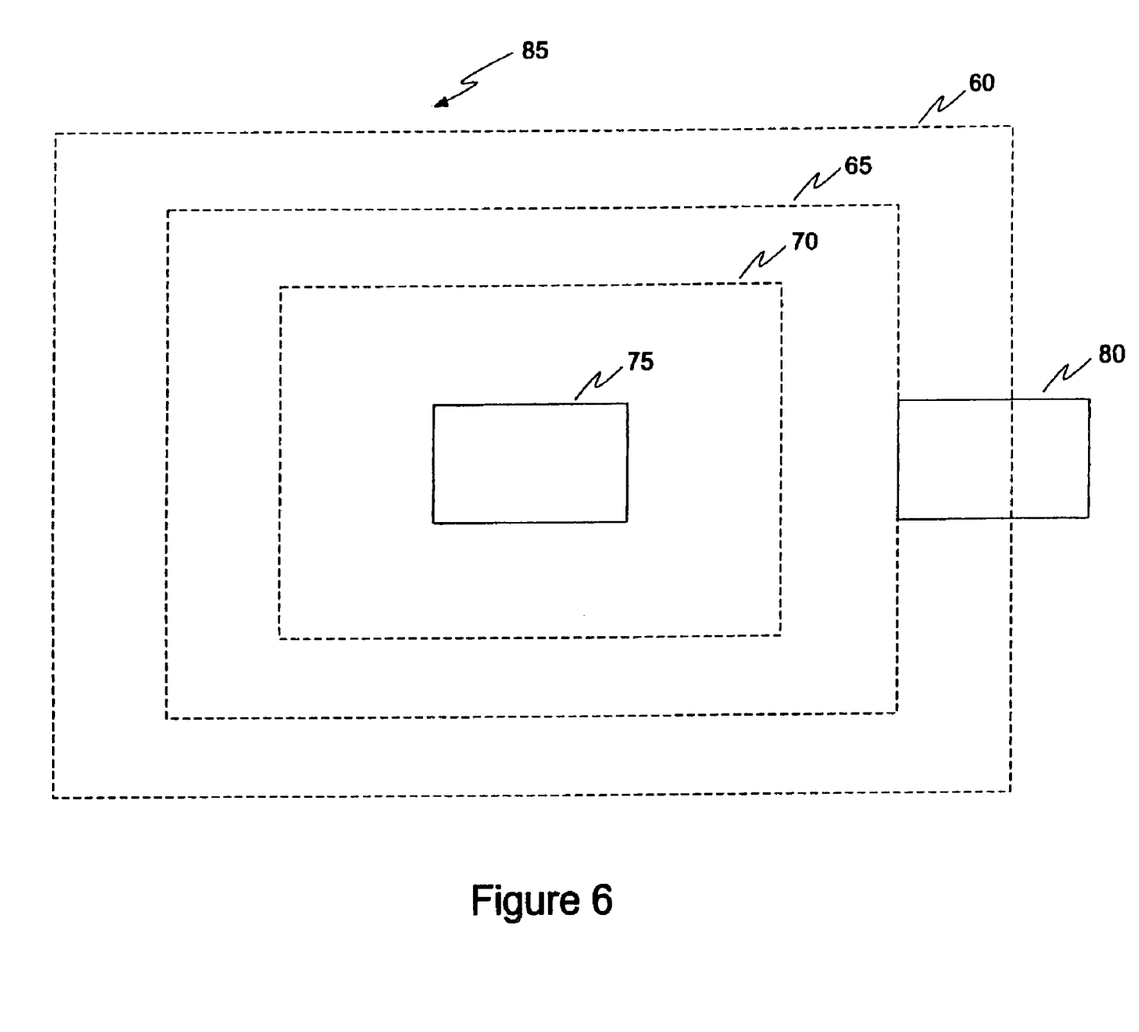
FIG. 6 is a schematic representation of the scanning window size options in accordance with an embodiment of the present invention.

A representation of the multiple scanning window sizes of the reader of the present invention is detailed in FIG. 6. For example, if the operator continually scans a UPC barcode 75, a code which is relatively small compared to the default field of view 60 of a typical image based reader, and has a roughly symmetrical aspect ratio, then the symbology reader would adjust the scanning window 85 down to a reduced size 65 or 70 that allows for a higher read rate but minimizes both scan, readout and symbology detection time by removing the unnecessary background information. Further, by reducing the window size 85, the number of partial decode errors caused by nearby symbols 80 within the default FOV is reduced since these symbologies would, in effect, be cropped from the FOV by the reduced scanning window sizes 65, 70.

The scanning window size 85 may be an adjustable parameter that is defined when the symbology reader is first programmed. The window size 85 could be selectable in a number of multiples of the size of the symbol dependent upon trading off aiming latitude, i.e. the breadth of aiming range, versus read rate. The window size 85 could be adjusted to two, three or four times the size of the symbology 75 for example. Larger multiples provide greater user latitude but increase the time to perform the decode sequence.

The scanning window 85 may be reset to the default FOV setting 60 by the algorithm in conjunction with the decode algorithms defaults being reset 52, either after a number of unsuccessful decodes, or after the triggering routine activated by a human operator, as described above.

In an alternative embodiment, the scanning window 85 may be reset independently of the decode default reset as described above. It may be reset by activating a unique trigger routine, for example, which resets only the scanning window size 85 back to the default FOV setting 60.

Figure 7:
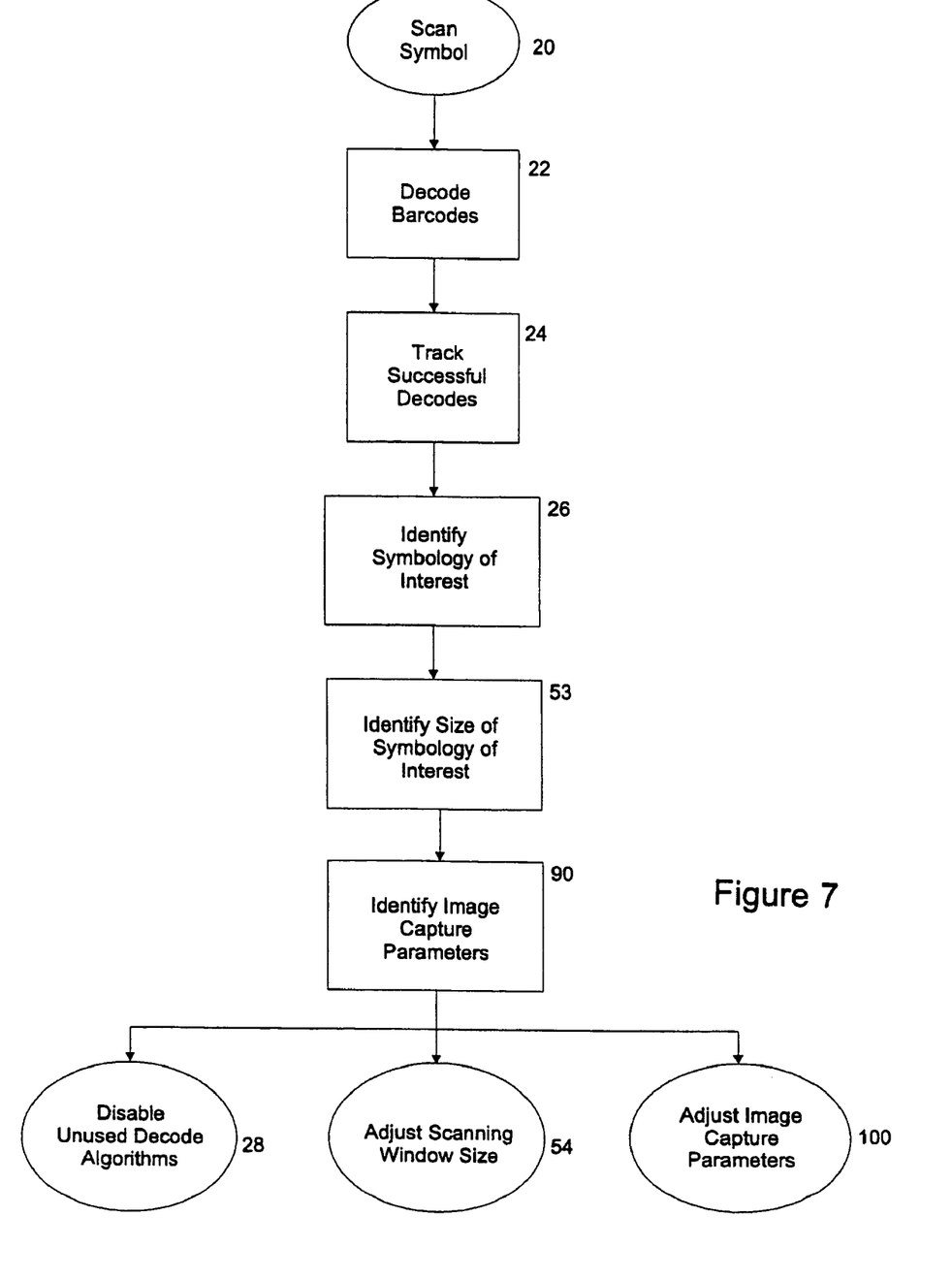
FIG. 7 is a flow chart illustrating the basic steps of the method in accordance with an embodiment of the present invention
Figure 8:
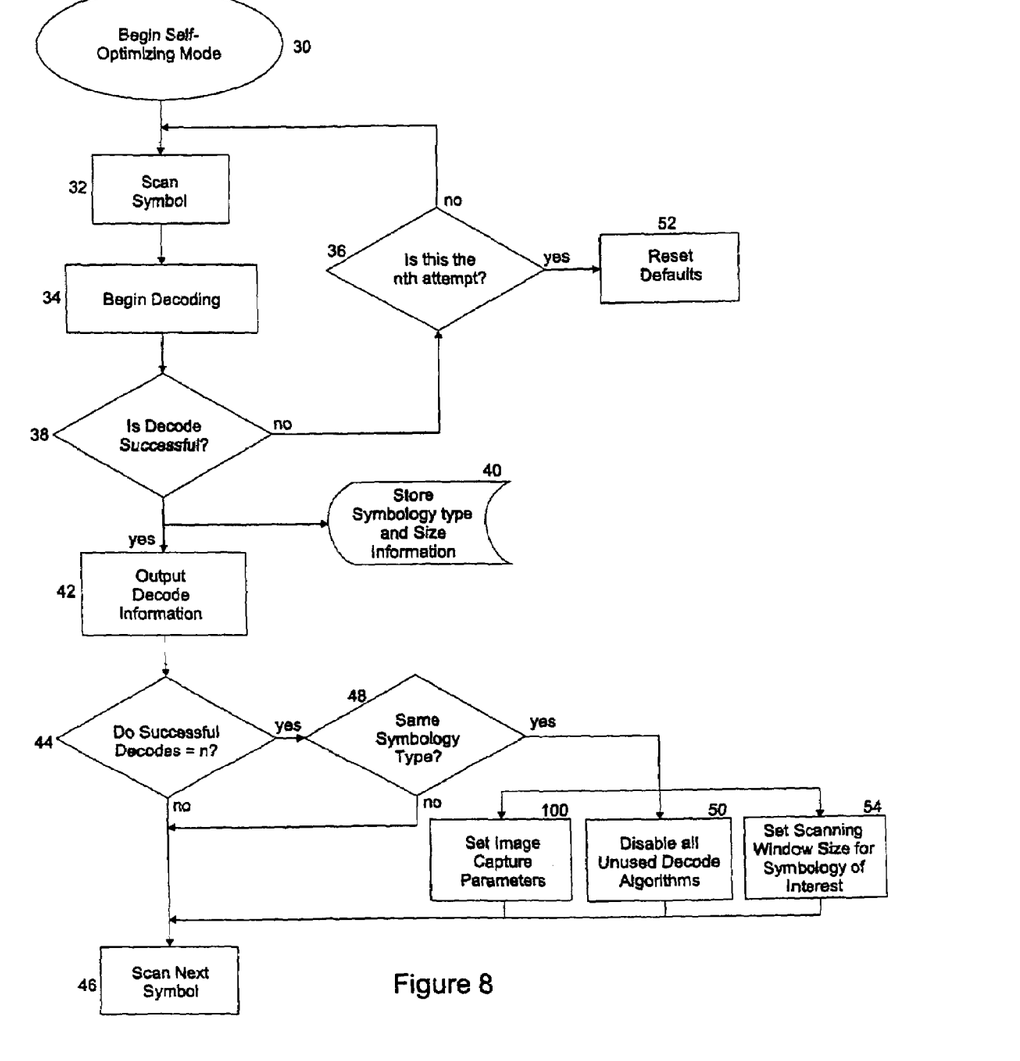
FIG. 8 is a partial flow chart depicting the method of the embodiment described in FIG. 7.

Another embodiment of the present invention is illustrated in FIGS. 7 and 8 and relates generally to image-based symbology readers. While most of the steps in the self-optimizing mode remain unchanged from the embodiments described above with regard to FIGS. 3 and 5, a new image capture step is added, in image-based symbology readers, in which the image capture parameters are set 100 after the symbology of interest has been identified. Adjusting the image capture parameters maximizes the robustness of reading of the symbology of interest. When the self-optimizing mode is activated, a symbology is scanned 20 and decoded 22. Each time the symbology reader performs a decode sequence, information about that decode sequence is tracked and written to memory 24. Identification of the symbology of interest 26 as well as the size of the symbology of interest 53 is extracted from the decode information. Additionally, in this embodiment, image capture information pertaining to the number of pixels per element 90 of the symbology of interest is also tracked. The unused algorithms are then disabled 28 and the scanning window size 54 and image capture parameters 100 may be adjusted as needed depending of the feature size of the symbology of interest.

Figure 9:
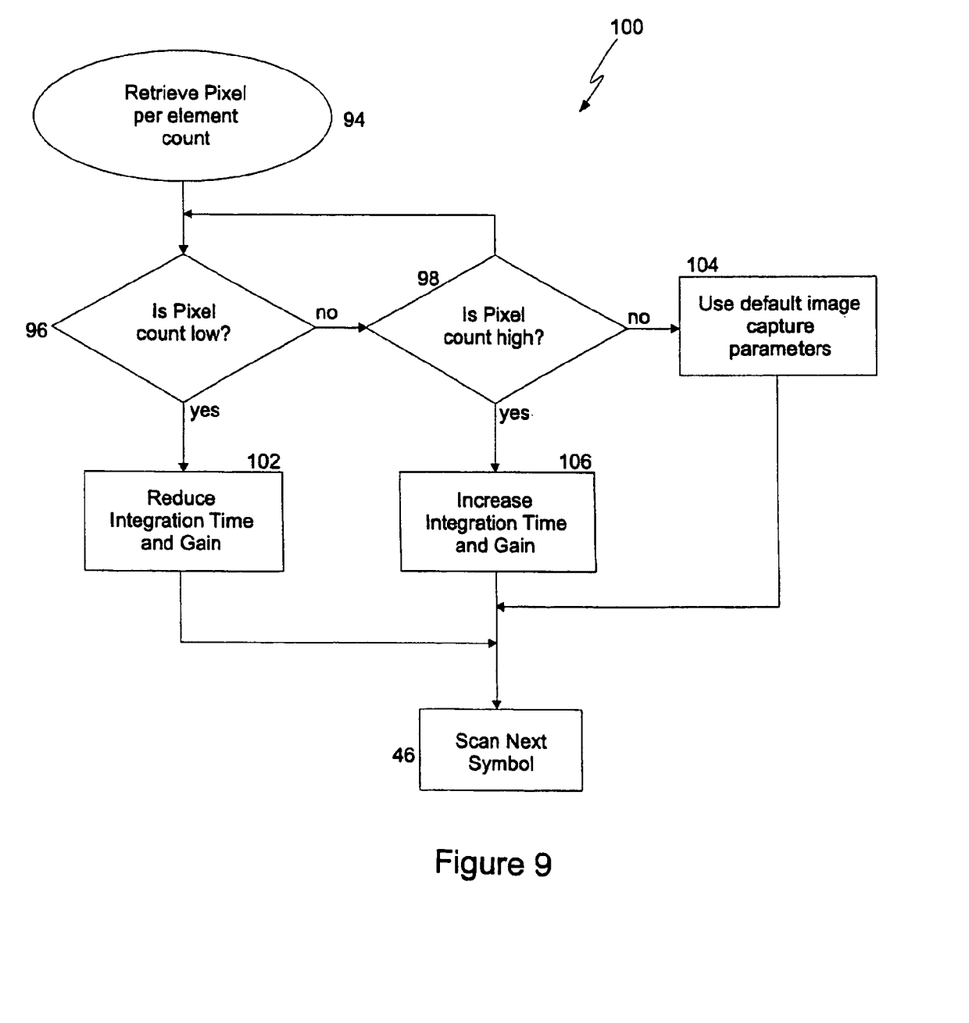
FIG. 9 is a partial flow chart depicting a step to set the image capture parameters in an embodiment of the present invention.

The step of setting the image capture parameters 100 within the self-optimizing mode is described in more detail with reference to the partial flowcharts of FIG. 9. The pixel per element count information is tracked and identified 94 and compared to a threshold value stored in memory. This threshold would likely be a small, predefined range of values representing the optimum pixel count per symbology element, corresponding to the default image parameter setting. If it is found that the number of pixels per element is small 96 compared to the threshold, leading to the potential for misreads as the number of imaged pixels per element or feature may be at the limit of the decoder algorithm or be affected by the image capture parameters of the image reader, the system would anticipate that the feature size of the printed symbol is also small and therefore the system would optimize the image capture parameters by reducing integration (exposure) time and digital image sensor gain 102. The reduction of integration time minimizes image blue induced by operator hand movement or jitter, while the reduction of gain reduces image noise that could result in a decode failure. This would typically be encountered in direct part mark reading applications where the code feature size must be quite small due to the limited area for code location on the marked parts.

Conversely, if the number of pixels per element were found to be very large 98, the system could anticipate that the feature size is quite large and would adjust the image capture parameters by increasing the integration or exposure time and digital image sensor gain 106. This effectively increases the depth of reading of the device, providing the user with more latitude in selecting a distance from which the symbology of interest would be readable. An example of this application would be warehousing operations which traditionally employ very large feature size symbols on large objects such as pallets or packages.

If the number of pixels per element is found to be acceptable, being within the threshold range, the default image capture parameters 104 remain unchanged for the next scan 46 and decode sequence. However, if the image capture parameters are adjusted 102 or 106, the next scan 46 and decode sequence will be performed with the newly optimized settings.

An advantage to disabling the decode algorithms not being used, adjusting the scanning window size and/or image capture parameters is improved symbology reader performance caused by increased speed of decoding, the elimination of unnecessary background information and/or optimized image capture. This is especially useful in settings where the same type of symbology with the same size parameters are used all the time or a series of similar symbologies are used repeatedly. The disabling of all unused algorithms minimizes the possibility of symbology recognition errors. Further, this method does not require user intervention in setting symbology decode type, scanning window size or image capture parameters.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims, must be accorded the broadest possible interpretation so as to encompass all such modifications and equivalent structures and functions.

What is claimed is:

1. A method for self-optimizing a symbology reader having a plurality of activated decode algorithms in storage comprising:
    scanning a succession of symbols;
    decoding the scanned symbols;
    tracking a succession of successfully decoded symbols;
    identifying a symbol type from among the succession of successfully decoded symbols, including determining whether the successfully decoded symbols are successively associated with the symbol type; and
    automatically disabling all decode algorithms not used to decode the identified symbol type.

2. A method as claimed in claim 1 wherein the symbol type is a specific symbol.

3. A method as claimed in claim 1 comprising:
    identifying the size of the identified symbol type; and
    adjusting the symbology reader window size.

4. A method as claimed in claim 1 comprising:
identifying image capture parameters; and
adjusting the symbology reader image capture parameters.

5. A method as claimed in claim 1 comprising:
retrieving a pixel per element count from the scanned symbol;
reducing the symbology reader integration time and gain when the count is below a predetermined threshold level; and
increasing the symbology reader integration time and gain when the count is above a predetermined threshold level.

6. A method as claimed in claim 1 wherein a decode algorithm similar to a decode algorithm for the identified symbol type remains enabled.

7. A method for self-optimizing a symbology reader having a plurality of activated decode algorithms in storage comprising:
scanning a succession of symbols;
decoding the scanned symbols;
storing symbol type information;
tracking successively decoded symbols, including counting the number of the successively decoded symbols;
identifying a symbol type from among the successively decoded symbols when the number of the successively decoded symbols reaches a redefined number, including determining whether the successively decoded symbols are associated with the symbol type; and
automatically disabling all decode algorithms not used to decode the identified symbol type.

8. A method as claimed in claim 7 wherein the symbol type is a specific symbol.

9. A method as claimed in claim 7 comprising:
identifying the size of the identified symbol type; and
adjusting the symbology reader window size.

10. A method as claimed in claim 7 comprising:
identifying image capture parameters; and
adjusting the symbology reader image capture parameters.

11. A method as claimed in claim 7 comprising:
retrieving a pixel per element count from the scanned symbol;
reducing the symbology reader integration time and gain when the count is below a predetermined threshold level; and
increasing the symbology reader integration time and gain when the count is above a predetermined threshold level.

12. A method as claimed in claim 7, wherein a decode algorithm similar to a decode algorithm for the identified symbol type remains enabled.

13. A system for self-optimizing a symbology reader having a plurality of activated decode algorithms in storage comprising:
a scanner for scanning a succession of symbols;
a decoder for decoding the scanned symbols;
a tracker for tracking a succession of successfully decoded symbols;
means for identifying a symbol type from among the succession of successfully decoded symbols, including means for determining whether the successfully decoded symbols are successively associated with the symbol type; and
a control for automatically disabling all decode algorithms not used to decode the identified symbol type.

14. A system as claimed in claim 13 wherein the symbol type is a specific symbol.

15. A system as claimed in claim 13 comprising:
means for identifying the size of the identified symbol type; and
a control for adjusting the symbology reader window size.

16. A system as claimed in claim 13 comprising:
means for identifying image capture parameters; and
a control for adjusting the symbology reader image capture parameters.

17. A system as claimed in claim 13 comprising:
a counter for retrieving a pixel per element count from the scanned symbol;
a control for reducing the symbology reader integration time and gain when the count is below a predetermined threshold level; and
a control for increasing the symbology reader integration time and gain when the count is above a predetermined threshold level.

18. A system for self-optimizing a symbology reader having a plurality of activated decode algorithms in storage comprising:
a scanner for scanning a succession of symbols;
a decoder for decoding the scanned symbols;
a memory for storing symbol type information;
a tracker for tracking successively decoded symbols, including a counter for counting the number of successively decoded symbols;
means for identifying a symbol type from among the successively decoded symbols when the number of successively decoded symbols reaches a predefined number, including means for determining whether the successively decoded symbols are associated with the symbol type; and
a control for automatically disabling all decode algorithms not used to decode the identified symbol type.

19. A system as claimed in claim 18 wherein the symbol type is a specific symbol.

20. A system as claimed in claim 18 comprising:
means for identifying the size of the identified symbol type; and
a control for adjusting the symbology reader window size.

21. A system as claimed in claim 18 comprising:
means for identifying image capture parameters; and
a control for adjusting the symbology reader image capture parameters.

22. A system as claimed in claim 18 comprising:
a counter for retrieving a pixel per element count from the scanned symbol;
a control for reducing the symbology reader integration time and gain when the count is below a predetermined threshold level; and
a control for increasing the symbology reader integration time and gain when the count is above a predetermined threshold level.

23. A system as claimed in claim 18 comprising:
a control for resetting the symbology reader defaults.

24. A method of optimizing a symbology reader having activated decode algorithms in storage comprising:
scanning a succession of symbols;
decoding the scanned symbols;
identifying a symbol type from among the decoded symbols;
disabling all decode algorithms not associated with the identified symbol type;
retrieving a pixel per element count from the scanned symbol; and adjusting at least one of the symbology reader integration time and gain based on the count.

25. A method as claimed in claim 24, wherein the step of adjusting comprises:
reducing the symbology reader integration time and gain when the count is below a predetermined threshold level.

26. A method as claimed in claim 24, wherein the step of adjusting comprises:
increasing the symbology reader integration time and gain when the count is above a predetermined threshold level.

27. A method as claimed in claim 24 further comprising tracking successfully decoded symbols, and wherein the step of identifying comprises identifying the symbol type from among the succession of the successfully decoded symbols.

28. A method as claimed in claim 24 further comprising storing symbol type information, and counting the number of successively decoded symbols, and wherein the step of identifying comprises identifying the symbol type based on the number of successively decoded symbols.

29. A system for optimizing a symbology reader having activated decode algorithms in storage comprising:
a scanner for scanning a succession of symbols;
a decoder for decoding the scanned symbols;
means for identifying a symbol type from among the decoded symbols;
a first controller for disabling all decode algorithms not used to decode the identified symbol type;
a counter for retrieving a pixel per element count from the scanned symbol; and
a second controller for adjusting at least one of the symbology reader integration time and gain based on the count.

30. A system as claimed in claim 29, wherein the second controller comprises:
a module for reducing the symbology reader integration time and gain when the count is below a predetermined threshold level.

31. A system as claimed in claim 29, wherein the second controller comprises:
a module for increasing the symbology reader integration time and gain when the count is above a predetermined threshold level.

32. A system as claimed in claim 29 further comprising a tracker for tracking successfully decoded symbols, and wherein the first controller comprises a module for identifying the symbol type from among the succession of successfully decoded symbols.

33. A system as claimed in claim 29 further comprising a memory for storing symbol type information, and a further counter for counting the number of successively decoded symbols, and wherein the first controller comprises a module for identifying the symbol type based on the number of successively decoded symbols.

* * * * *

UNITED STATES PATENT AND TRADEMARK OFFICE
CERTIFICATE OF CORRECTION

PATENT NO. : 7,281,659 B2  Page 1 of 1
APPLICATION NO. : 10/980012
DATED : October 16, 2007
INVENTOR(S) : Page It is certified that error appears in the above-identified patent and that said Letters Patent is hereby corrected as shown below:

In the Specifications:

In Column 1, Line 64, delete "et." and insert -- et --, therefor.

In Column 4, Line 10, delete "invention" and insert -- invention. --, therefor.

In Column 4, Lines 10-11, delete "FIG. 3 is a......FIG. 2." and insert the same at Line 11, as a new paragraph.

In Column 4, Line 60, delete "(LED's)." and insert -- (LEDs). --, therefor.

In the Claims:

In Column 9, Line 27, in Claim 7, delete "redefined" and insert -- predefined --, therefor.

Signed and Sealed this
Sixteenth Day of April, 2013

Teresa Stanek Rea
*Acting Director of the United States Patent and Trademark Office*